: US 6,939,093 B2
(12) United States Patent
Arvin et al.

(45) Date of Patent: Sep. 6, 2005

(54) CHAMFER HOB AND METHOD OF USE THEREOF

(76) Inventors: Joseph L. Arvin, 13246 Wood Duck Dr., Plainfield, IL (US) 60544; Herbert A. Grubel, 4603 Dumoulin Ave., Lisle, IL (US) 60532

( * ) Notice: Subject to any disclaimer, the term of this patent is extended or adjusted under 35 U.S.C. 154(b) by 128 days.

(21) Appl. No.: 10/310,417

(22) Filed: Dec. 5, 2002

(65) Prior Publication Data

US 2004/0109735 A1 Jun. 10, 2004

(51) Int. Cl.[7] .................................................. B23F 5/22
(52) U.S. Cl. .............................. 409/12; 409/11; 407/23
(58) Field of Search .............................. 407/23, 24, 25, 407/26, 27, 28, 29, 20, 21, 22; 409/11, 12, 13, 50, 51, 56, 57, 14, 15, 16, 17, 18, 19, 20, 21, 22, 23, 24

(56) References Cited

U.S. PATENT DOCUMENTS

| | | | | |
|---|---|---|---|---|
| 2,597,129 A | * | 5/1952 | Remich | 407/26 |
| 2,932,239 A | * | 4/1960 | Wildhaber | 409/26 |
| 2,978,964 A | * | 4/1961 | Wildhaber | 409/26 |
| 3,580,029 A | * | 5/1971 | Daniel et al. | 29/893.32 |
| 3,738,225 A | * | 6/1973 | Tixier | 409/12 |
| 4,023,246 A | * | 5/1977 | Haug et al. | 407/56 |
| 5,114,287 A | * | 5/1992 | Ervay et al. | 409/13 |
| 5,494,475 A | * | 2/1996 | Basstein et al. | 407/28 |
| 5,720,584 A | * | 2/1998 | Sijtstra | 409/12 |
| 6,116,828 A | * | 9/2000 | Egawa et al. | 409/12 |
| 6,416,262 B1 | * | 7/2002 | Ishimaru et al. | 409/1 |
| 6,536,999 B1 | * | 3/2003 | Bradfield et al. | 409/26 |
| 2002/0081161 A1 | * | 6/2002 | Yamada et al. | 407/20 |

FOREIGN PATENT DOCUMENTS

| | | | | |
|---|---|---|---|---|
| DE | 3630912 A | * | 3/1988 | B23F/21/16 |
| DE | 10230148 A1 | * | 1/2004 | B23F/23/00 |
| JP | 55031571 A | * | 3/1980 | B23F/21/16 |

* cited by examiner

Primary Examiner—Derris H. Banks
Assistant Examiner—Dana Ross
(74) Attorney, Agent, or Firm—Ryndak & Suri; Vangelis Economou

(57) ABSTRACT

A chamfer hob for and a method of providing a chamfered end and having an identical chamfer angle at both a front face and a back face of a gear including a shaft, a plurality of helical cutting vanes extending radially outwardly from the shaft, such that the radially outward surface of the cutting vanes defines a hob diameter, and a hob radius, a predetermined radial width of the desired chamfer and a depth of chamfer, such that the chamfering is done on both faces of the gear teeth ends resulting in a uniform chamfer around the periphery of the complete gear tooth. The method includes the steps of providing a blank gear die, including a gear shaft and a disk having a front face distally disposed from the gear shaft and back face proximally disposed to the gear shaft, each of the front and back faces having gear, providing a gear hob and a chamfer hob on a single hob spindle, the chamfer hob having a plurality of helical cutting vanes extending radially outwardly from the hob shaft, such that the radially outwardly extending surface of the cutting vanes, mounting the gear blank on a mount, mounting the hob spindle, including the gear hob and the chamfer hob, on a mounting device for rotation therewith, bringing the gear hob in proximity to and in contact with the edges of the gear blank so as to form gear teeth on the gear blank, bringing the chamfer hob in proximity to and in contact with the edges along the front face of the gear teeth formed in the preceding step so as to produce a uniform chamfer around the edges of the gear teeth and bringing the gear hob in proximity to and in contact with the edges along the back face of the gear teeth formed so as to produce a uniform chamfer around the edges of the gear teeth.

8 Claims, 5 Drawing Sheets

CHAMFER HOB AND METHOD OF USE THEREOF

BACKGROUND OF THE INVENTION

1. Field of the Invention

This invention relates generally to hobbing machines, and more specifically, to hobbing machines in which finishing operations including gear teeth cutting, deburring and double sided chamfering are performed in several operational steps using a single automated hob spindle.

2. Background Art

Gear teeth are usually cut or milled in automated machines, sometimes referred to as hobbing machines. These machines operate on a usually cylindrical or disc-shaped gear blank by sequentially cutting or milling the gear teeth using a conventional commercially available hobbing machine. Examples of such hobbing machines are described in U.S. Pat. No. 2,451,447, No. 3,130,642 and No. 6,116,828.

Gear teeth are provided as a result of the hobbing operation in an unfinished state, and may result in the teeth having a burr and sharp edges following the initial hobbing operation. Accordingly, a second finishing operation has been found necessary to remove the burr from the cut or milled edges of the gear teeth, and also to bevel the edges to remove the sharp edges and corners. It is generally undesirable to have sharp corners on gear teeth because as gear teeth mesh during gear operation, there is a tendency to stress the contact points of the gear teeth, leading to chipping or other deformation, which events may detract from continued smooth operation of the gears.

There generally exists a need to avoid such sharp corners in gear teeth, especially at the surfaces that initially contact edges and the opposing gear face, since the greatest stresses occur at the contact points. Generally, most hobbing processes and machines provide for a second finishing operation in the course of which the sharp edges are chamfered at an acute angle while simultaneously deburring the burr from the machined edge. In a further improvement, this end chamfer operation has been performed, with respect to the edge having the burrs, in a single operation using a second hob, preferably on the same rotating spindle as the first hob, so that both operations may be performed sequentially without removing the gear blank from hobbing equipment. Such hobbing machines and procedures are described in the aforementioned U.S. Pat. No. 2,451,447, the teachings of which are incorporated by reference herein.

The equipment and operation for providing a chamfer on the gear teeth at one end of a gear produces gear teeth that are capable of, and having sufficient integrity for, use in most applications. However, for those applications in which the stresses acting on the gear teeth are greater than normal, additional operations on the gears are required to enable the gears to withstand the greater stresses. For example, in the aerospace field, gears are usually placed in operation at rotational speeds that are much greater than those normally encountered in, for example, automotive applications. The stresses on the gears as they mesh during operation are magnified and any slight imperfection or defect in the configuration of the gear teeth may cause undesirable chipping or bending stress cracks, ultimately resulting in catastrophic failure of the gears.

One of the problems that contributes to gear teeth deformities is the asymmetrical configuration of the chamfered end of a standard gear made in accordance with the equipment and method of conventional gears, for example, of aforementioned U.S. Pat. No. 2,451,447. The lack of a chamfered or beveled edge surface on both ends of the gear teeth causes unsymmetrical contact and stress forces to act on the gear teeth, and the sharp edges which are left in the gear teeth by the first hobbing operation make the gear teeth more susceptible to cracking, chipping or other deformations at the high stress loads encountered.

Methods have been developed by gear manufacturers to address the problem of asymmetrically chamfered gear teeth. For example, manual chamfering of the back surface of each gear tooth by a person operating a hand grinder is conventionally used. Alternatively, the back edges of the gear teeth are chamfered using a stand alone machine, for example a Gratomat Deburring machine or a Contour Milling machine. Both of these methods have been found to be unsatisfactory, however, because hand operation of a hand grinder even by a skilled operator results in slight imperfections in the uniformity of chamfer, which may themselves lead to asymmetries in the gear teeth, and that may result in the undesirable creation of deformities. More importantly, both of these chamfering methods require a separate operation and separate stand-alone equipment.

These alternative deburring methods are inefficient, mostly unproductive and unnecessarily costly because of the added space requirements, personnel requirements necessary to operate the stand alone separate equipment, and the added process steps required to set up, use and breakdown equipment and mount pieces within a second set of stand alone machinery. Thus, what is considered necessary is equipment and a deburring/chamfering process that enable the production of gears and gear teeth having both a front and rear end chamfer on the gear teeth provided by a single stand-alone unit, that produces gear teeth that are symmetrical so that the gears can withstand the increased stresses of, and can be used in the high rotational speeds found in, aircraft and other aeronautical or aerospace applications.

SUMMARY OF THE INVENTION

Accordingly, what is disclosed herein is a chamfer hob for providing a chamfered end having a chamfer angle m at both a front face and a back face of a gear, the hob comprising a shaft, a plurality of helical cutting vanes extending radially outwardly from the shaft, such that the radially outward surface of the cutting vanes defines a hob diameter h, and a hob radius r, a predetermined radial width a of the desired chamfer as determined by a projection of the depth of chamfer b at the chamfer angle m, and the depth of chamfer b being defined by $b=a(\sin m)$ wherein the parameters of the hob are defined by the following equations:

$c = (\text{hob diameter})/2 - b$ or $c = r - b$ $d = (c)\sin(90° - m)$ $e = (c)\cos(90° - m)$ $g = e - $ dedendum of gear $f = \sqrt{[(g)^2 + (d)^2]}$ $j = e - $ depth of gear $h = \sqrt{[(j)^2 + (d)^2]}$.

In a preferred embodiment, a hob pressure angle α is defined in accordance with the equations:

Tip to Ref Size of Hob=(hob−diam./2)−f;

Tooth thickness of hob=l+2(tan α)·(Tip to Ref of Hob), and a Whole Depth of the Hob is defined in accordance with the following equation:

Whole Depth of Hob=(hob dia./2)−h+clearance.

Preferably, in the above equations, the chamfer angle m is approximately 45°, the hob pressure angle α is predetermined to be about 37°, and the clearance is predetermined to be approximately 0.030" (where the clearance is provided to avoid the hob root from striking the gear tooth.

The inventive method of providing a chamfered end on both a front face and a back face of a gear, the chamfered end having a chamfer angle, comprises the steps of providing a blank gear die, including a gear shaft and a disk having a front face distally disposed from the gear shaft and back face proximally disposed to the gear shaft, each of the front and back faces having gear, providing a gear hob and a chamfer hob on a single hob spindle, the chamfer hob having a plurality of helical cutting vanes extending radially outwardly from the hob shaft, such that the radially outwardly extending surface of the cutting vanes, mounting the gear blank on a mount, mounting the hob spindle, including the gear hob and the chamfer hob, on a mounting device for rotation therewith, bringing the gear hob in proximity to and in contact with the edges of the gear blank so as to form gear teeth on the gear blank, bringing the chamfer hob in proximity to and in contact with the edges along a first one of the front or rear faces of the gear teeth formed in the preceding step so as to produce a uniform chamfer around the edges of the gear teeth; and bringing the gear hob in proximity to and in contact with the edges along the second one of the front or rear faces of the gear teeth formed so as to produce a uniform chamfer around both the edges of the gear teeth. In a preferred form, the uniform chamfer is provided by utilizing a chamfer hob having the above defined parameters.

DETAILED DESCRIPTION OF THE PREFERRED EMBODIMENTS

Figure 1:
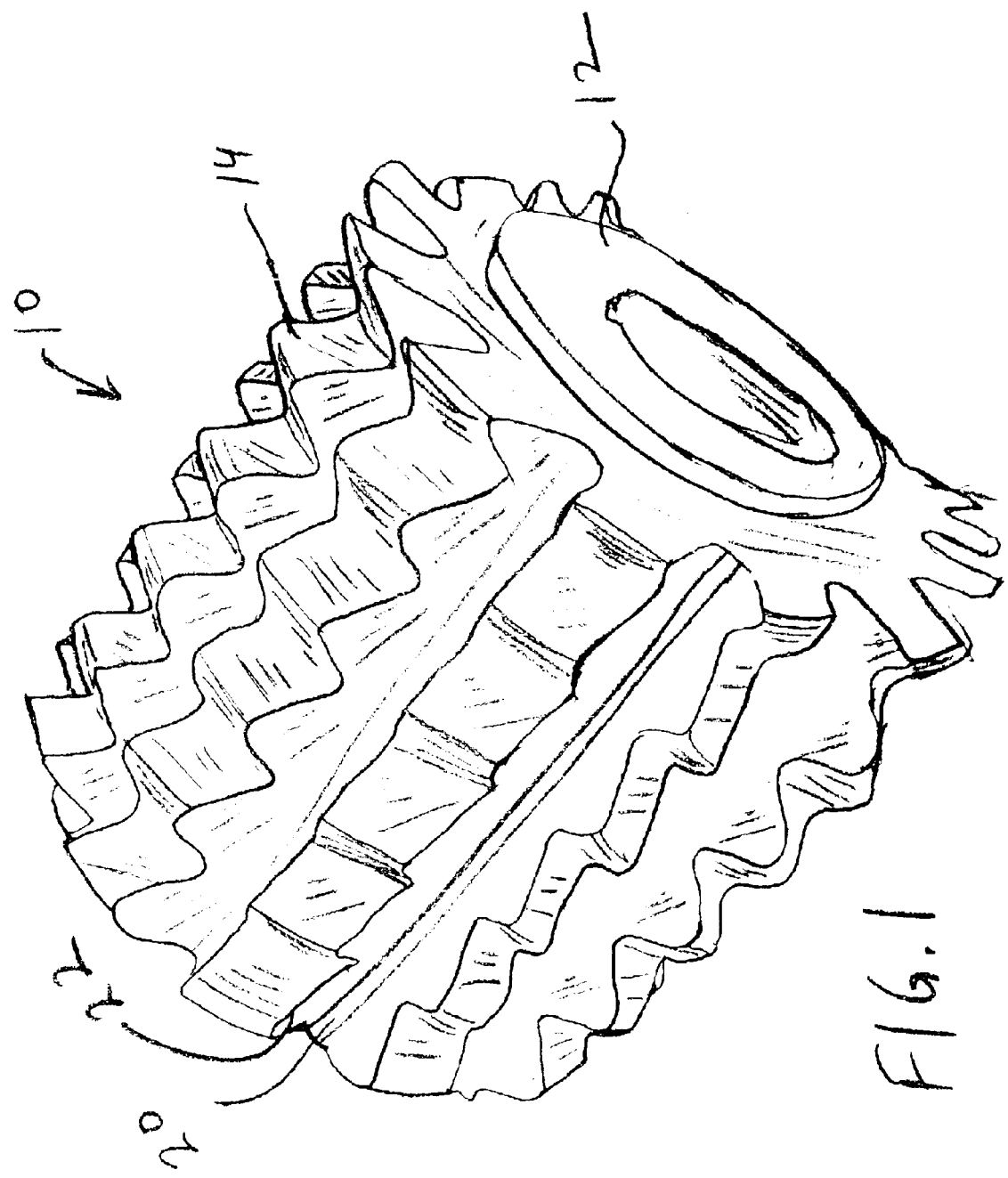
FIG. 1 illustrates in a perspective view a hob according to the present invention for use in a process according to the present invention.

FIG. 1 shows in a perspective view, a hob 10 for providing a chamfer to both ends of a gear blank, which has previously been rough cut, is used at a stage after the gear teeth have been cut by a first hobbing procedure. A central bore 12 permits the insertion of the hob 10 over a shaft (not shown in FIG. 1) for facilitating gear blank rotation. The hob 10 is generally cylindrical in shape, and will have a number of cutting or milling teeth 14, arranged in longitudinal rows, as shown. Each tooth 14 essentially takes on the shape of sine wave, so that a row 16 of teeth 14 viewed in cross-section will appear as a virtually sinusoidal pattern. The exact shape of each tooth is a significant feature of the invention, as will be described below.

Although the teeth may initially be seen as being in identical and radially symmetrical rows, closer inspection will show, as is known by those with ordinary skill in the art, that each row of teeth is slightly offset in the axial or longitudinal direction relative to the teeth 14 in the immediately adjacent rows. The teeth follow a spiral screw pattern, with grooves 18, removed at predetermined intervals, as will be explained below. The rotation of both the hob (not shown) and the chamfer hob 10 around a spindle is precisely timed to journal with a corresponding rotation around the axis of the gear, separately rotated by so that a different tooth 14 is presented to the hobbing tool at sequential intervals. Such a process for cutting and chamfering is known in the art, for example, see aforementioned U.S. Pat. No. 2,451,447 and will therefore not be discussed in great detail herein, except with reference to the features of the invention.

Figure 2:
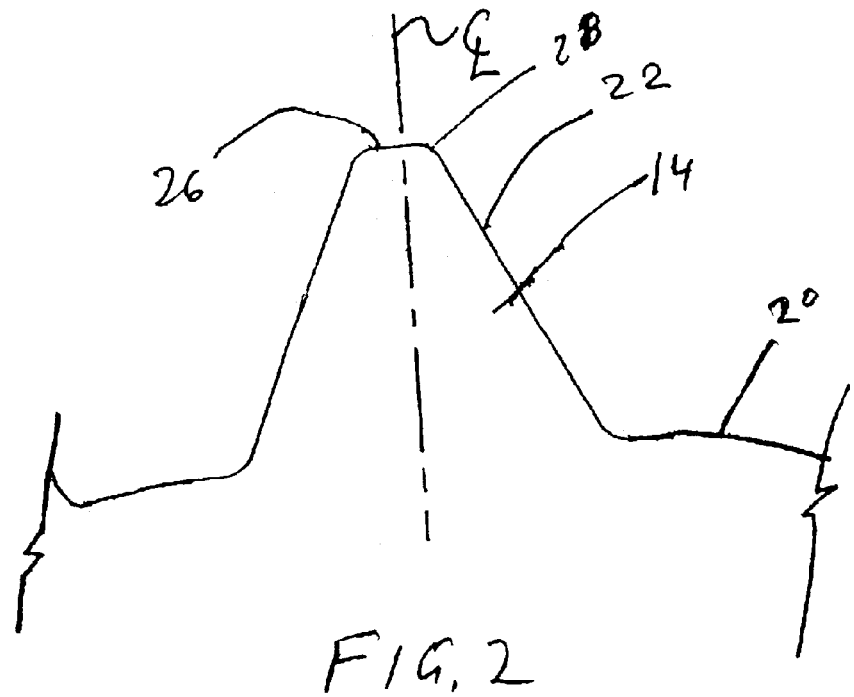
FIG. 2 is a detail view along the axial direction of the hob-cutting tooth made according to one embodiment of the present invention shown in FIG. 1.

Referring now to FIGS. 1 and 2, there is illustrated a side or circumferential view of a cutting tooth 14, shown in greater detail, of an involute spline hob 10. The tooth 14 extends radially outwardly from the nominally cylindrical surface 20 of the hob 10. Each tooth 14 comprises a radially extending projection that is preferably symmetrical around a center line CL, as shown. The edges 22, one end of which is shown in FIG. 2, are sharp cutting edges that are used to mill or cut into the metal surfaces of the gear. Thus, the material of the hob 10, usually comprising tool steel alloys and other materials, such as Tungsten Carbide (WC), M45PM, etc., which are necessarily much tougher than the gear material, and preferably having a minimum Rockwell hardness of at least 64.5. Coatings, for example, TIN or TIALN may be used for increasing surface hardness of the hobs. Other materials or metal alloys may be used having as long as the hardness meets the necessary requirements.

The radially outermost surface 26 of the tooth 14 may be flat, as shown, and rounded corners 28 provide for the cutting or milling characteristics that provide the desired teeth of the gears. The rounded corners, also referred to herein as the tip radius of the hob, is preferably a full fillet, so as to provide a gradual and smooth milling operation during finishing of the gear. This feature of the invention will be described in greater detail with reference to FIGS. 5 and 6.

Figure 3:
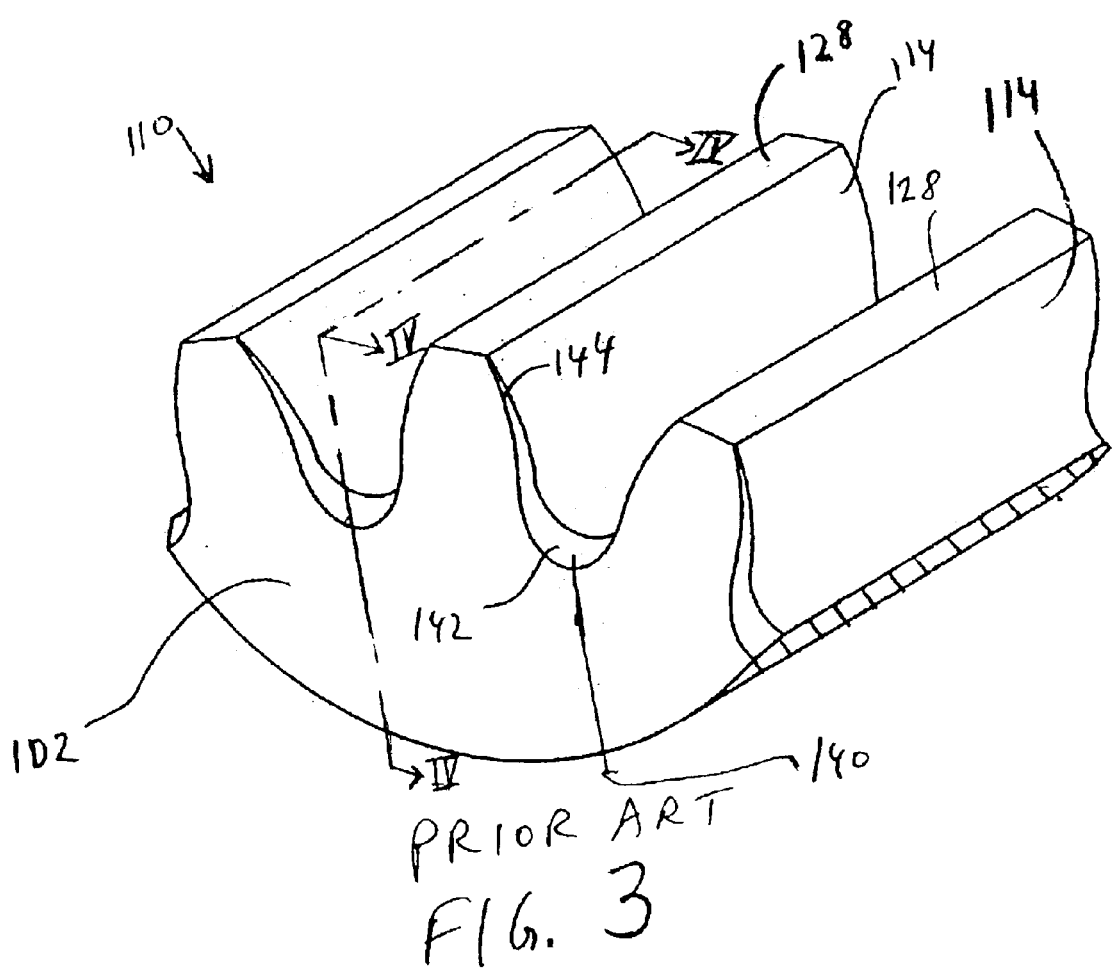
FIG. 3 is a detailed perspective, cutaway view of a section of a conventionally manufactured gear showing a non-uniform chamfer.

Referring now to FIG. 3, a detailed cut away view of a conventional gear 110, such as that made using the conventional equipment, for example, that described in aforementioned U.S. Pat. No. 2,451,447 is shown. The gear 110 includes a set of gear teeth 114, each having a flattened or non-milled outer diameter surface 128. It should be noted that in these gear teeth shown in FIG. 3, the surface 128 is essentially perpendicular to the front-end surface 102 of the gear 110.

The conventional gear teeth 114 comprise a chamfer 140 at each of the end surfaces or ends, one of which ends surfaces 102 is shown in FIG. 3 that define the cylindrical gear blank. As is readily apparent, the chamfer 140 is non-uniform, that is, the bottom chamfer portion 142, disposed at the bottom of a "valley" between adjacent gear teeth 114, has a width that narrows as it approaches a radially outer portion 144, disposed adjacent the top surface 128 of gear teeth 114.

It should be noted, however, that a chamfer angle m, as measured between the end surface 102 and the chamfer 140 may be identical and is, preferably equal to approximately 45°.

Figure 4:
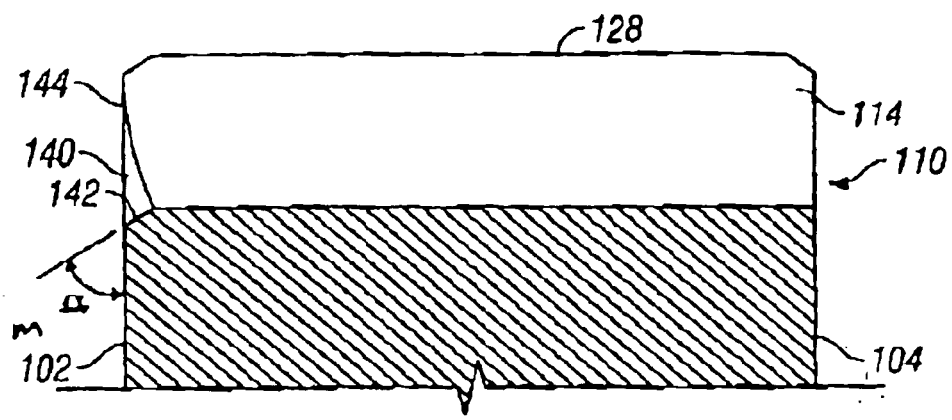
FIG. 4 is a cross-sectional view of one tooth of a conventional gear shown in FIG. 3, taken approximately along the line IV—IV.

The angle m is shown more clearly at FIG. 4, which is a cross-section taken approximately along a plane IV—IV of FIG. 3. The body of the gear tooth 110 is defined by the front end surface 102 and back end surface 104. As is apparent in the cross-sectional view of FIG. 4, no chamfer is provided at the back end surface 104 as a result of the initial hob chamfer operation when performed according to the teachings of the aforementioned U.S. Pat. No. 2,451,447. As described above, such a chamfer can only be provided by a second chamfering operation, not utilizing a hob but performed either on a stand alone CNC milling machine or by a hand grinder, which, at best, would provide for a non-uniform chamfer (not shown).

It should be noted also that the chamfer 140 has a chamfer angle extending from the radially inner portion 142 bottom of the tooth 114 toward the radially outer portion 144. As is shown, it is the difference in depth of the chamfer 140, that is, the decreasing chamfer width, as measured at the inner portion 142 toward the outer portion 144, that causes the decrease in the chamfer width. For a band ground chamfer, one of the deformations may result from an improper angle of the hand grinder relative to the gear tooth, and a resulting difference in chamfer width may be produced by a small difference in the angle m when the chamfer is ground at different portions of the chamfer surface 140.

Figure 5:
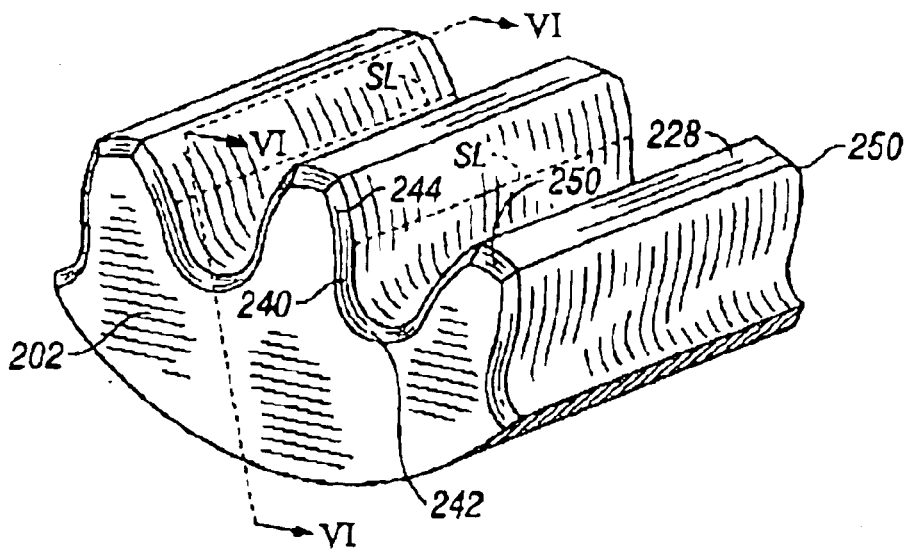
FIG. 5 is a detailed perspective, cutaway view of the gear teeth, including the chamfer at the rear end, of a gear manufactured in accordance with the inventive method.
Figure 6:
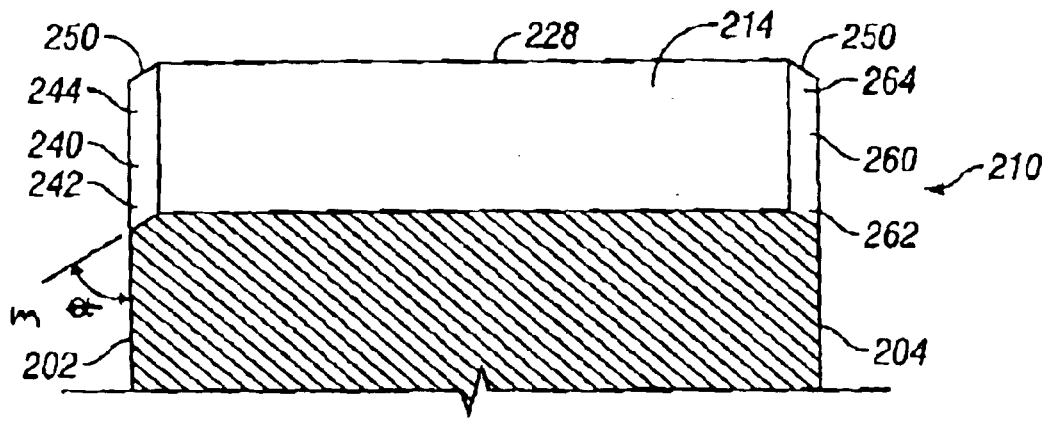
FIG. 6 is a cross-sectional view of a gear made in accordance with the present invention.

Referring now to FIGS. 5 and 6, identical views of a gear tooth manufactured according to the inventive method and utilizing a chamfer hob and system equipment according to the present invention are shown.

As is apparent in the gear teeth 214 shown in FIGS. 5 and 6, there is a beveled or chamfered edge 240 around the complete outline of the edges of the teeth 214, both at an inner diameter portion 242 and at the outer diameter portion 244. Moreover, and as is desirable in gear teeth for use in aeronautical or aerospace applications, the chamfer 240 is a uniform shape, relative to the front end surface 202 and as measured by the width of the chamfer 240, essentially along the entire chamfer surface.

The uniformity and symmetrical configuration of the chamfer 240 on teeth 214 are important from the standpoint of reducing the stresses and contact loads which are placed on individual teeth. As is known by those having ordinary skill in the gear industry, the greatest amount of stress load during gear operation is that which is encountered during the first meshing contact between opposing gear teeth as adjoining gears are rotated one by another. As the gear teeth mesh together, the first contact of the gear teeth occurs when the outer diameter portions of a gear tooth engage an opposing gear tooth 214. That first contact point usually occurs at a position immediately adjacent the gear central portion of the gear teeth, which is indicated by dotted lines SL in FIGS. 5 and 6, and which is disposed between the inner diameter portion 242 and the outer diameter portion 244 of the gear teeth 214.

There are known methods to avoid the initial gear contact at the end surface edges of the gear teeth 214, for example, by cutting the gear teeth so that the surface at the central portion is slightly convex at and immediately adjacent the central portion SL, and especially at the central section of that portion that is disposed between the two ends. However, although these slightly convex areas provide the initial contact point of the gear teeth, this may not be assured when high stress loads are encountered during which various deforming actions may take place, for example, non-uniform heating of the gears. Any slight initial imperfections in the shape and configuration of the gear teeth may shift the initial contact point away from the central area. It should be also understood that the high stress loads of the meshing gears slightly deform the shape of the gear teeth themselves so that the gear teeth bend slightly to accommodate the stress load placed on them by a meshing gear tooth. All of the deforming actions can and do shift the initial contact point away from the preferred area, when the gear teeth are most likely to be stressed, and may focus the stresses at the ends adjacent the end surfaces 202 and 204. Thus, a chamfer edge such as chamfer 240 is necessary at both ends, as shown in FIGS. 5 and 6 and described above.

Importantly, the chamfer is preferably as uniform as is possible so as to accommodate the gear teeth deforming actions, which will be encountered during high stress loads. In the case where there is some non-uniformity in the chamfer, for example, such as in the conventional gear teeth shown in FIGS. 3 and 4, the stresses and deforming action caused by the asymmetrical chamfer cause undesirable initial contact removed from the central area adjacent the line SL because of asymmetrical deformation of the teeth. If this initial contact occurs adjacent the edges, and may cause undesirable focusing or magnification of the stress load over an area that is not designed to carry such high stress loads.

This may lead to shear forces to which the gear teeth are subjected that cannot be accommodated by the asymmetrical tooth chamfer found in conventional gear teeth. These shear forces are, of course, repeated at each rotation of the gear teeth so that an initial asymmetry in the gear teeth may translate into an increasingly unstable situation in which the deformity of the gear tooth may be increased by continued and increasingly stressful action on the gear teeth as the rotational speed increases to, or is maintained at, the higher speeds necessary for aeronautical applications. Thus, the end result may be a catastrophic failure, for example, caused by the shearing off a gear tooth, which when loose, may become a speeding projectile and a danger to the safety of those on board an airplane or aerospace ship in which such gears are used.

Referring again to FIGS. 5 and 6, the gear teeth 214 include a chamfered edge 260 disposed along the edge of the tooth where it intersects the rear end surface 204. The chamfer 260 is in most respects identical to, albeit a mirror image of, the chamfer 240 adjacent the front end surface 202. A conventional chamfered edge surface 250, which may be milled into the rough cut gear blank prior to the first hobbing operation, is preferably provided at both the front and back end surfaces 202, 204, as shown. These chamfered edge surfaces will intersect the chamfered portions 244, 264 close to the outer diameter edges of the gear, and so remove another sharp edge, which may provide a weak stress point. Preferably, the edge chamfer 250 is slightly larger than the desired size, because some additional material, at the root diameter 223 of the gear (FIG. 7) will be removed in a finishing hob operation. This finishing hob operation produces a smooth surface of the gear teeth 214, and also removes any burrs that may have formed on the faces 204 of the gear teeth 214 during the hob chamfer step.

Figure 7:
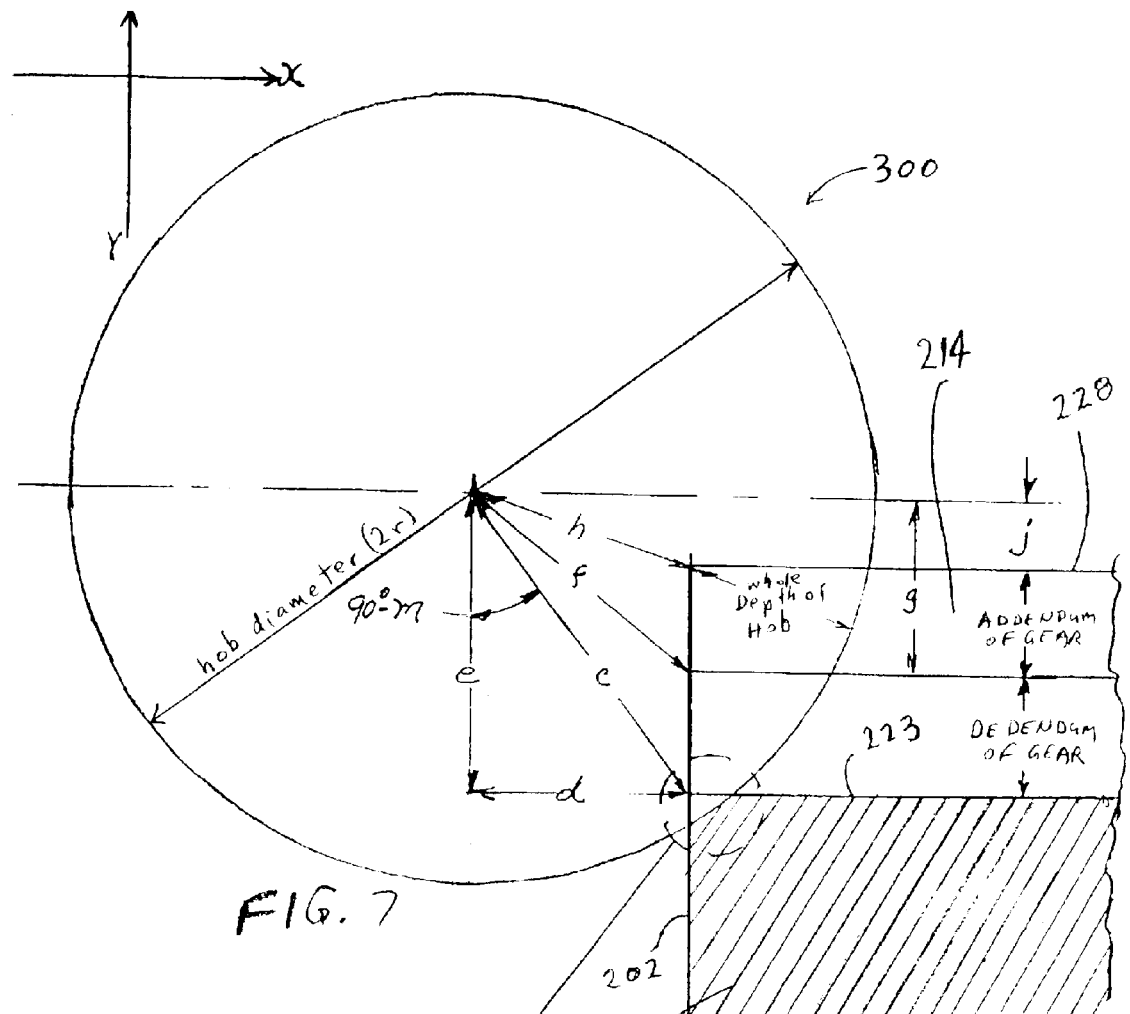
FIG. 7 is a schematic view of a hob cutter made according to the present invention in the process of providing a chamfer to a gear.
Figure 8:
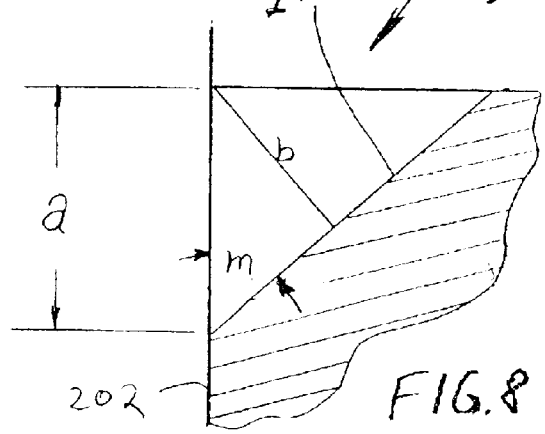
FIG. 8 is a detailed schematic view, in cross-section, of the gear having a chamfer provided by the cutter of FIG. 6.

It is also an important feature of this invention that the chamfer has essentially the same width, as measured from one chamfer edge at the intersection with the side end surfaces 202, 204, and the other edge, where the edge chamfers 250 intersect the circumferential edge 228, or the surfaces of gear teeth 214. The constant uniform width of the chamfer effectively provides a graduated stress profile that is rendered by its shape and dimensions to best withstand the forces and stresses producing gear operation. To produce this chamfering, a special chamfering hob in accordance with the present invention is used. Referring now to FIGS. 7 and 8, a cross-sectional view of a chamfering hob, made in accordance with the present invention, shows the hob 300 in cross-section, as it is in operation for chamfering a gear tooth 214. The gear 210 being chamfered is shown in cross-section taken along a radius extending along a line passing through the innermost groove between the gear tooth 214 and the adjacent tooth, and is similar to the cross-section of the gear 210 illustrated in FIG. 6. Both the front and back faces 202, 204 are chamfered for each gear tooth 214.

The gear dimensions are for the most part conventional, for example, an outer diameter defines the outer surface 228, the end face is defined at 202, the bottom of the trough, also known as the root diameter, defines inner most diameter which the gear is cut, to an axial trough line 223. The top portion, outer diameter, of the gear is referred to as the addendum and the bottom portion of the gear tooth is referred to as the dedendum. The width of the desired chamfer is designated as $a$ in the detailed view shown in FIG. 8.

It should be understood that the "width of the chamfer" is defined by that portion of the end face that is removed, as shown. The width of the chamfer, taking into account the chamfer angle m provides the amount of material removed in the chamfering process, leaving a distance b from the original corner that is defined by the equation:

$$b = a(\sin m) \quad (1)$$

These parameters, that is, the parameters defining the chamfer size and angle, provide the basis for the remaining parameters of the chamber hob. Listed below are the parameters characteristic of the hob, in equation form, with the relative dimensions as indicated in FIG. 7.

$$c = (\text{hob diameter})/2 - b \text{ or } c = r - b \text{ where } r \text{ is the radius of the hob} \quad (2)$$

$$d = (c)\sin(90° - m) \quad (3)$$

$$e = (c)\cos(90° - m) \quad (4)$$

$$g = e - \text{dedendum of gear} \quad (5)$$

$$f = \sqrt{[(g)^2 + (d)^2]} \quad (6)$$

$$j = e - \text{depth of gear} \quad (7)$$

$$h = \sqrt{[(j)^2 + (d)^2]} \quad (8)$$

Figure 9:
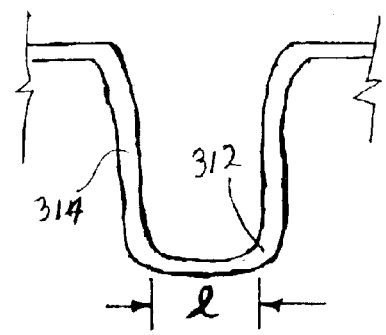
FIG. 9 is a detailed plan view of the chamfered surface of a gear between two adjacent teeth made in accordance with this invention.

As shown in FIG. 9, when the chamfer between two adjacent teeth is illustrated, the length of the chamfer is defined at its beginning.

As indicated in FIG. 9, the length l of the chamfer is the width of the root chamfer at the projected slot width 314. The length l is used to define the parameters of the hob.

Utilizing the above parameters, the following equations now provide for the shape configuration and dimensions of the chamfer hob:

$$\text{Tip to Ref Size of Hob} = (\text{hob-diam.}/2) - f \quad (9)$$

$$\text{Tooth thickness of hob} = l + 2(\tan \alpha) \cdot [(\text{Hob Dia.}/2) - f] \text{ (where } \alpha \text{ is preferably } 37°) \quad (10)$$

$$\text{Whole depth of Hob} = (\text{hob dia}/2) - h + \text{clearance (clearance equals about 0.030")} \quad (11).$$

Referring again to FIGS. 7 and 8, we note that the x axis of hob center to the end of the face of the gear is equal to d, and in the y direction, the y axis of the hob center to the outside diameter of the gear is equal to the dimension j.

It has been found that for purposes of producing an ideal hob device, for working both surfaces of the gear faces, it is desirable that the hob pressure angle $\alpha$ is nominally 37°, as described in equation (10), that the diametrical pitch of the hob is substantially equal to the diametrical pitch of the gear, and that the hob swivel angle is equal to 0°.

Figure 10:
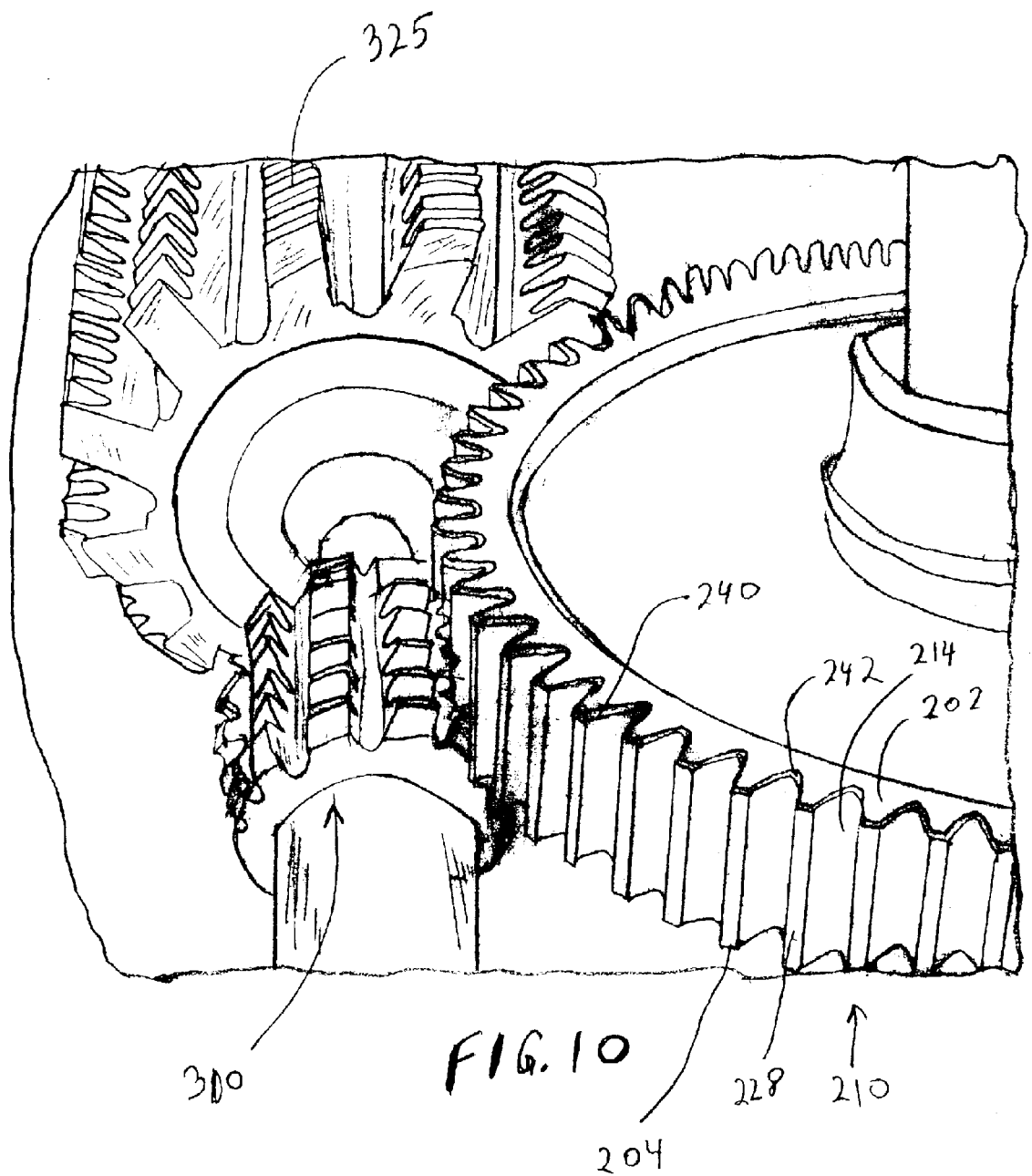
FIG. 10 is a perspective view of an operational rendition of the chamfer hob made according to the present invention as it engages a gear.

Referring now to FIG. 10, a perspective view of a gear 210, having teeth 214 is shown during the chamfering process performed by the chamfer hob 300. In the background, the hob cutter 325 is shown after it has cut the gear teeth 214. Both the hob cutter 325 and the chamfer hob 300 are on a common spindle.

As is visible in FIG. 10, a chamfer 240 has already been produced by the chamfer hob 300 in a previous pass over the top (front) face 202 of the gear 210, and the chamfer hob 300 is now providing a chamfer to the reverse or back face of the gear 210.

Although the preferred embodiment is described above for purposes of illustration and description, the invention is not to be considered limited by the above description, but is to be considered as including any modifications, changes and alterations and the invention is to be limited only by the following claims.

What is claimed is:

1. A chamfer hob for providing a chamfered end having a chamfer angle m at both a front face and a back face of a gear, the hob comprising:

a shaft;

a plurality of helical cutting vanes extending radially outwardly from the shaft, such that the radially outward surface of the cutting vanes defines a hob diameter 2r, and a hob radius r, a predetermined radial width a of the desired chamfer as determined by a projection of the depth of chamfer b at the chamfer angle m, and the depth of chamfer b being defined by b=a (sin m)

wherein the parameters of the hob are defined by the following equations:

$$c = (\text{hob diameter})/2 - b \text{ or } c = r - b$$

$$d = (c)\sin(90° - m)$$

$$e = (c)\cot(90° - m)$$

$$g = e - \text{dedendum of gear}$$

$$f = \sqrt{[(g)^2 + (d)^2]}$$

$$j = e - \text{whole depth of gear}$$

$$h = \sqrt{[(j)^2 + (d)^2]}.$$

2. The chamfer hob according to claim 1 wherein the chamfer angle m is approximately 45°.

3. The chamfer hob according to claim 1 wherein the hob pressure angle $\alpha$ is defined in accordance with the following further equations:

Tip to Ref Size of Hob=(hob-diam./2)-$f$

Tooth thickness of hob=$l$+2(tan $\alpha$)·[(hob-diam./2)-$f$].

4. The chamfer hob according to claim 3 wherein the hob pressure angle $\alpha$ is predetermined to be about 37°.

5. The chamfer hob according to claim 1 wherein the Whole Depth of the Hob is defined in accordance with the following further equation:

Whole Depth of Hob=(hob dia./2)-$h$+clearance, (where the clearance is provided to avoid the hob root from striking the gear tooth).

6. The chamfer hob according to claim 5 wherein the clearance is predetermined to be approximately 0.030".

7. A method of providing a chamfered end on both a front face and a back face of a gear, the chamfered end having a chamfer angle m, comprising the steps of:

a) providing a gear blank, the gear blank including a gear shaft and a disk having a front face distally disposed from the gear shaft and a back face proximally disposed to the gear shaft, each of the front and back faces having a gear edge;

b) providing a gear hob and a chamfer hob on a single hob spindle, the chamfer hob having a plurality of helical cutting vanes extending radially outwardly from the hob shaft;

c) mounting the gear blank on a mount;

d) mounting the hob spindle, including the gear hob and the chamfer hob, on a mounting device for rotation therewith;

e) bringing the gear hob in proximity to and in contact with the edges of the gear blank so as to form gear teeth on the gear blank;

f) bringing the chamfer hob in proximity to and in contact with the edges along a first one of the front or rear faces of to gear teeth formed in the preceding step so as to produce a uniform chamfer around the edges of the gear teeth; and g) bringing the chamfer hob in proximity to and in contact wit the edges along the second of the front or rear faces of the gear teeth formed in the step e) so as to produce a uniform chamfer around both the edges of the gear teeth.

8. The method of providing a double chamfered end on a gear according to claim 7 wherein the chamfer hob is defined by a hob diameter 2r, and a hob radius r equal to 2r /2, and wherein the predetermined radial width a of the desired chamfer on the chamfered end provides the parameters of the chamfer hob, as determined by a projection of the depth of chamfer b at the chamfer angle m, and the depth of chamfer b being defined by b=a(sin m)

wherein the chamfer hob is provided having the following parameters as further defined by the equations:

a) $c=D/2-b$ or $c=r-b$ b) $d=(c)\sin(90°-m)$ c) $e=(c)\cos(90°-m)$ d) $g=e-$dedendum of gear e) $f=\sqrt{[(g)^2+(d)^2]}$ f) $j=e-$whole depth of gear g) $h=\sqrt{[(j)^2+(d)^2]}$.

* * * * *